United States Patent
Perronnet et al.

[11] 3,856,974
[45] Dec. 24, 1974

[54] FUNGICIDAL USE OF 3,4-DIBROMOBUTYRONITRILE

[75] Inventors: Jacques Perronnet; Pierre Girault, both of Paris, France

[73] Assignee: Roussel Uclaf, Paris, France

[22] Filed: Oct. 10, 1973

[21] Appl. No.: 404,932

[30] Foreign Application Priority Data
Oct. 26, 1972  France .............................. 72.37977

[52] U.S. Cl. .............................. 424/304, 106/15 AF
[51] Int. Cl. ........................ A01n 9/06, A01n 9/20
[58] Field of Search ................. 424/304; 260/465.7; 106/15 AF

[56] References Cited
UNITED STATES PATENTS
3,608,084   9/1971   Matt .................................. 424/304

FOREIGN PATENTS OR APPLICATIONS
117,464     10/1942   Australia .......................... 260/465.7
1,209,662   3/1960    France .............................. 424/304
37-17995    11/1962   Japan .............................. 260/465.7

OTHER PUBLICATIONS

Chem. Abst., 41, (1947) – 1797(c) – Cotton et al.

*Primary Examiner*—Albert T. Meyers
*Assistant Examiner*—Douglas W. Robinson
*Attorney, Agent, or Firm*—Hammond & Littell

[57]   ABSTRACT

Fungicidal compositions with 3,4-dibromobutyronitrile as the active ingredient and method of killing fungi.

2 Claims, No Drawings

FUNGICIDAL USE OF 3,4-DIBROMOBUTYRONITRILE

STATE OF THE ART 3,4-dibromobutyronitrile has been described by Couvreur et al [Bull. Soc. Chim. Belge, Vol. 61 (1952), p. 253-260] and U.S. Pat. No. 3,608,084 describes the use of certain halogenated aliphatic nitriles as bactericides. The said patent, however, reports on the negative bactericidal results obtained with 3,4-dibromobutyronitrile.

OBJECTS OF THE INVENTION

It is an object of the invention to provide novel fungicidal compositions.

It is another object of the invention to provide a novel method of combatting fungi.

These and other objects and advantages of the invention will become obvious from the following detailed description.

THE INVENTION

The novel fungicidal composition of the invention are comprised of an effective amount of 3,4-dibromobutyronitile and a carrier. The compositions may be in the form of powders, granules, suspensions, emulsions or solutions containing, besides the active ingredient, for example, a vehicle and/or anionic, nonionic or cationic surface active agent to assure a uniform dispersion of the ingredients in the composition. The vehicle may be a liquid such as water, alcohol, hydrocarbons or other organic solvents or a mineral, animal or vegetable oil or a powder such as talc, clays, silicates or Kieselguhr.

The compositions of the invention are particularly useful for the protection of paper pulp and paints from fungi. For paper pulp protection, 3,4-dibromobutyronitrile is added to pulp at a preferred concentration of 5 to 1,000 mg/liter. For paint protection, 3,4-dibromobutyronitrile is added during grinding of the pigments for the paint at a preferred concentration of 0.1 to 5% by weight.

The fungi tested against in paper pulp successfully were *Aspergillus flavus*, *Chaetomium globosum* and *Penicillium roqueforti* and the fungi tested against in paints were *Penicillium luteum*, *Myrothecium Verrucaria*, *Cladosporium herbarum*, *Stachybotrys atra*, *Paecylomyces varioti*, *Pullularia pullulans*, *Trichoderma lignorum*, *Chaetomium globosum* and *Aspergillus niger*.

The novel method of the invention for killing fungi and preventing their growth comprises contacting fungi with a fungicidally effective amount of 3,4-dibromobutyronitrile. The compound may be added to paints or industrial waters such as paper pulp.

In the following examples there are described several preferred embodiments to illustrate the invention. However, it should be understood that the invention is not intended to be limited to the specific embodiments.

EXAMPLE 1

The fungicidal activity of 3,4-dibromobutyronitrile for the protection of paper pulp was tested against *Aspergillus flavus*, *Chaetomium globosum* and *Penicillium roqueforti*.

The fungistatic activity was determined with 4 ml tubes containing Czapeck medium containing paper pulp (sterile medium). 0.5 ml of the test product in solution were added thereto and the tubes were then seeded with 0.5 ml of a spore suspension of the test fungi. The inclined tubes were placed in a room at 20° C and 60% relative humidity for 7 days. The readings were taken by visual estimation as a percentage of mycelium development and the concentration which inhibited the development was considered the fungistatic dose.

The fungicidal activity was determined after 48 hours of contact between the spore suspension and the test product solution. A transplant was made, with an inoculating thread to a gelose malt medium from each of the tubes of the preceding test. The tesst was held at 20° C and 60% relative hmidity for 4 days and the readings were made by visual estimation of the precent of mycelium development. The absence of colonies showed the fungicidal dose. The results are reported in Tables I to III.

TABLE I

| | *Aspergillus flavus* | | | |
|---|---|---|---|---|
| Concentration in ppm of product | 100 | 50 | 10 | 5 |
| % of fungistatic efficacity | 100 | 100 | 100 | 0 |
| % of fungicidal efficacity | 100 | 50 | 0 | 0 |

TABLE II

| | *Chaetomium globosum* | | | | |
|---|---|---|---|---|---|
| Concentration in ppm of product | 1000 | 500 | 100 | 50 | 10 |
| % of fungistatic efficacity | 100 | 100 | 100 | 100 | 0 |
| % of fungicidal efficacity | 100 | 100 | 50 | 0 | 0 |

TABLE III

| | *Penicillium roqueforti* | | | | |
|---|---|---|---|---|---|
| Concentration in ppm of product | 500 | 100 | 50 | 10 | 5 |
| % of fungistatic efficacity | 100 | 100 | 100 | 50 | 0 |
| % of fungicidal efficacity | 100 | 100 | 0 | 0 | 0 |

Tables I to III show that 3,4-dibromobutyronitrile possesses interesting fungicidal and fungistatic activity

EXAMPLE II

The fungicidal activity of 3,4-dibromobutyronitrile for the protection of paints was effected by incorporating 10 ml of an acetone solution of the test product into 100 g of paint (oil base or water base paint) at concentrations of 2, 1, 0.5 and 0.25% by weight of the active compound. Layers of paint were prepared by spreading the paint thus treated on poyethylene sheets while the control layers were untreated. After drying at 24 to 48 hours, the paint layers were removed from the polyethylene and were cut into 5 × 2 cm pieces. The said test pieces of paint were placed in dishes containing a gelose nutritive medium free from assimilable carbon and comprised of 3 g of ammonium nitrate, 0.5 g of magnesium sulfate, 0.25g of potassium chloride, 1 g of monopotassium phosphate, 15 g of agar-agar and 1,000 g of permate water. Before addition of agar-agar, the pH was adjusted to 6–7. Each dish contained two test pieces and four tests were run for each concentration.

The test pieces were contaminated by placing on each test piece drops of a fungi spore suspension of *Penicillium luteum, Myrothecium verrucaria, Cladosporium herbarum, Stachybotrys atra, Paecylomyces Varioti, Pullularia pullulans, Trichoderma lignorum, Chaetomium globosum* and *Aspergillus niger*. The samples were stored in a tropical room at 35° C and 95% relative humidity for three months. The attack before washing and after washing (developments above all samples, developments by placement of drops; stains at the placement of the drops, no attack) was noted. The washing was for the purpose of eliminating the developments and the stains caused by mould which developed on the surface without attacking the paint. The results of the following Tables show that 3,4-dibromobutyronitrile has a good activity for protecting paints against the moulds tested.

| PENICILLIUM LUTEUM | WATER BASE PAINT | | | | | | | | OIL BASE PAINT | | | | | | | |
|---|---|---|---|---|---|---|---|---|---|---|---|---|---|---|---|---|
| | before washing | | | | after washing | | | | before washing | | | | after washing | | | |
| Concentrations % M A | 2 | 1 | 0,5 | 0,25 | 2 | 1 | 0,5 | 0,25 | 2 | 1 | 0,5 | 0,25 | 2 | 1 | 0.5 | 0,25 |
| Developement over all the test piece | | | | | | | | | | | | | | | | |
| Developement at the placement of the drops | | + | | | | | | | | | | | | | | |
| Stains at the placement of the drops | | | + | + | | + | + | + | | | | | | | | |
| TOTAL PROTECTION | + | | | + | + | + | + | + | + | + | + | + | + | + | + | + |
| MYROTHECIUM VERRUCARIA Concentrations % M A | | | | | | | | | | | | | | | | |
| Developement over all the test piece | | | | | | | | | | | | | | | | |
| Developement at the placement of the drops | + | + | + | | | | | | | | | | | | | |
| Stains at the placement of the drops | | | | + | | | | | + | + | + | + | | | | |
| TOTAL PROTECTION | | | | | + | + | + | + | | | | | + | + | + | + |
| CLADOSPORIUM HERBARUM Concentrations % M A | | | | | | | | | | | | | | | | |
| Developement over all the test piece | | | | | | | | | | | | | | | | |
| Developement at the placement of the drops | | | + | + | | | | | | | | | | | | |
| Stains at the placement of the drops | + | + | | | | | | | + | + | + | + | | | | |
| TOTAL PROTECTION | | | | | + | + | + | + | | | | | + | + | + | + |

| STACHYBOTRYS ATRA | WATER BASE PAINT | | | | | | | | OIL BASE PAINT | | | | | | | |
|---|---|---|---|---|---|---|---|---|---|---|---|---|---|---|---|---|
| | before washing | | | | after washing | | | | before washing | | | | after washing | | | |
| Concentrations % M A | 2 | 1 | 0,5 | 0,25 | 2 | 1 | 0,5 | 0,25 | 2 | 1 | 0,5 | 0,25 | 2 | 1 | 0,5 | 0,25 |
| Developement over all the test piece | | | | | | | | | | | | | | | | |
| Developement at the placement of the drops | | | | | | | | | | | | | | | | |
| Stains at the placement of the drops | | | | | | | | | | | | | | | | |
| TOTAL PROTECTION | + | + | + | + | + | + | + | + | + | + | + | + | + | + | + | + |
| PAECYLOMYCES VARIOTI Concentrations % M A | | | | | | | | | | | | | | | | |
| Developement over all the test piece | | | | | | | | | | | | + | | | | |
| Developement at the placement of the drops | | | | | | | | | | | | | | | | |
| Stains at the placement of the drops | + | + | + | + | | + | + | + | + | + | + | | | | | + |
| TOTAL PROTECTION | | | | | + | + | | | | | | | + | + | + | |
| PULLULARIA PULLULANS Concentrations % M A | | | | | | | | | | | | | | | | |
| Developement over all the test piece | | | | | | | | | | | | | | | | |
| Developement at the placement of the drops | + | + | + | + | | | | | + | + | + | + | | | | |
| Stains at the placement of the drops | | | | | + | + | + | + | | | | | | | + | |
| TOTAL PROTECTION | | | | | | | | | | | | | + | + | | + |

| TRICHODERMA LIGNORUM | WATER BASE PAINT | | | | | | | | OIL BASE PAINT | | | | | | | |
|---|---|---|---|---|---|---|---|---|---|---|---|---|---|---|---|---|
| | before washing | | | | after washing | | | | before washing | | | | after washing | | | |
| Concentrations % M A | 2 | 1 | 0,5 | 0,25 | 2 | 1 | 0,5 | 0,25 | 2 | 1 | 0,5 | 0,25 | 2 | 1 | 0,5 | 0,25 |
| Developement over all the test piece | | | + | + | | | | | | + | + | + | | | | |
| Developement at the placement of the drops | + | + | | | | | | | | | | | | | | |
| Stains at the placement of the drops | | | | | | | + | | + | | | | | + | + | + |
| TOTAL PROTECTION | | | | | + | + | | + | | | | | + | | | |
| CHAETOMIUM GLOBOSUM Concentrations % M A | | | | | | | | | | | | | | | | |
| Developement over all the test piece | | | | | | | | | | | | | | | | |
| Developement at the placement of the drops | + | + | + | + | | | | | | + | | | | | | |
| Stains at the placement of the drops | | | | | | | + | + | | + | + | + | | | | |
| TOTAL PROTECTION | | | | | + | + | | | | | | | + | + | + | + |
| ASPERGILLUS NIGER Concentrations % M A | | | | | | | | | | | | | | | | |
| Developement over all the test piece | | | | | | | | | | | + | | | | | |
| Developement at the placement of the drops | + | + | + | + | | | | | | | | | | | | + |
| Stains at the placement of the drops | | | | | + | + | + | + | + | + | + | | + | + | + | |
| TOTAL PROTECTION | | | | | | | | | | | | | | | | |

Various modifications of the composition and method of the invention may be made without departing from the spirit or scope thereof and it should be understood that the invention is intended to be limited only as defined in the appended claims.

We claim:

1. A method of killing fungi comprising contacting fungi with a fungicidally effective amount of 3,4-dibromobutyronitrile.

2. The method of claim 1 wherein 3,4-dibromobutyronitrile is in a paint.

* * * * *